Feb. 16, 1932.  C. F. SCHNUCK  1,845,199
ROLL CALIPER
Filed July 30, 1927   2 Sheets-Sheet 2
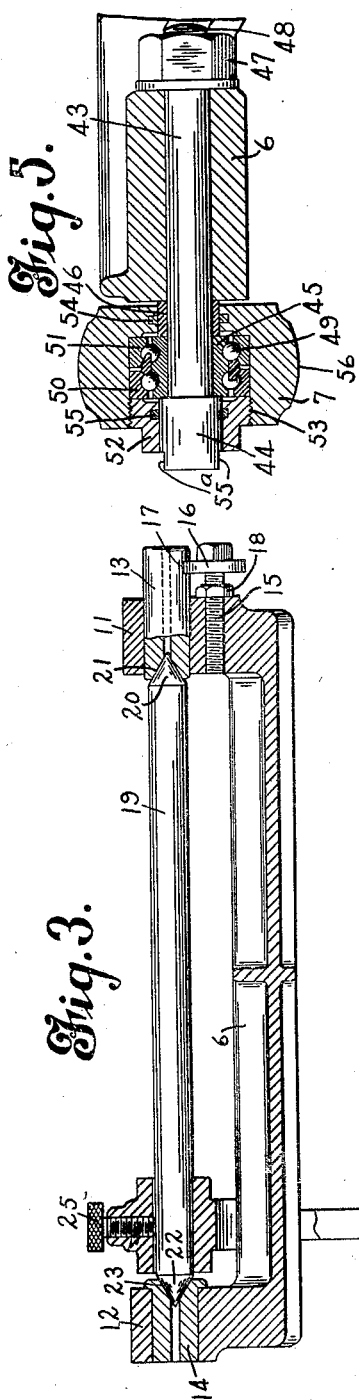
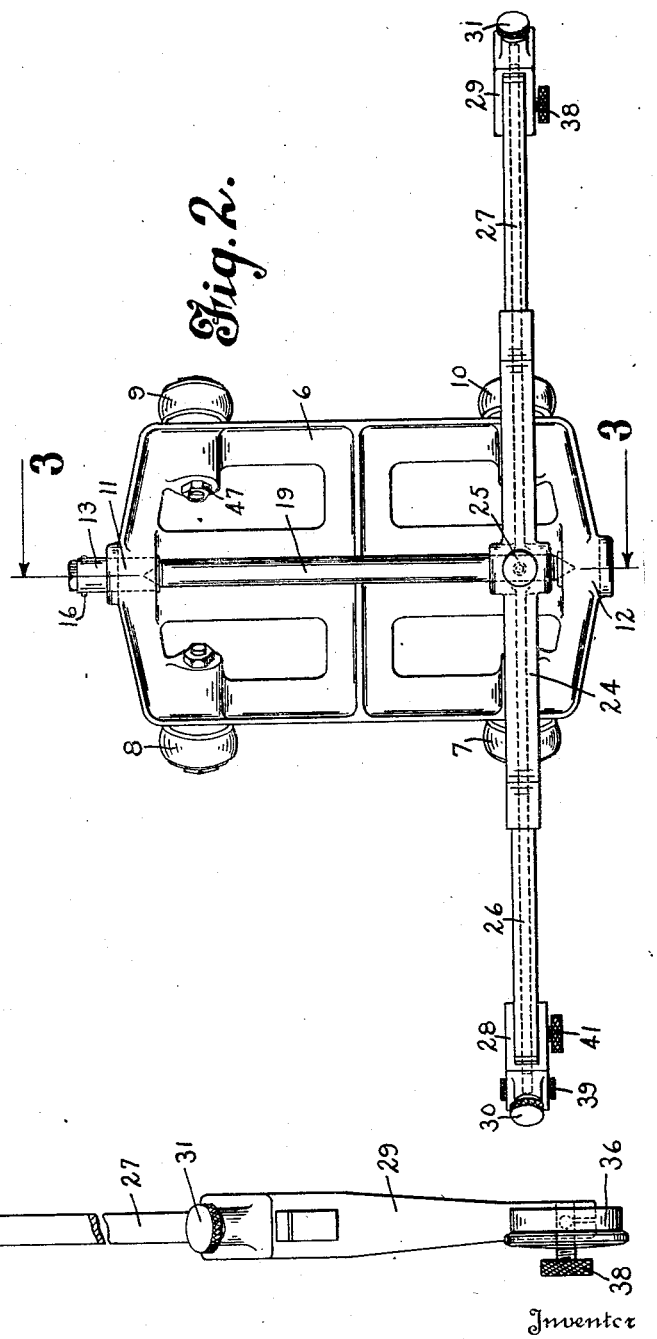
Inventor
Carl F Schnuck
By Rockwell & Bartholow
Attorneys Patented Feb. 16, 1932

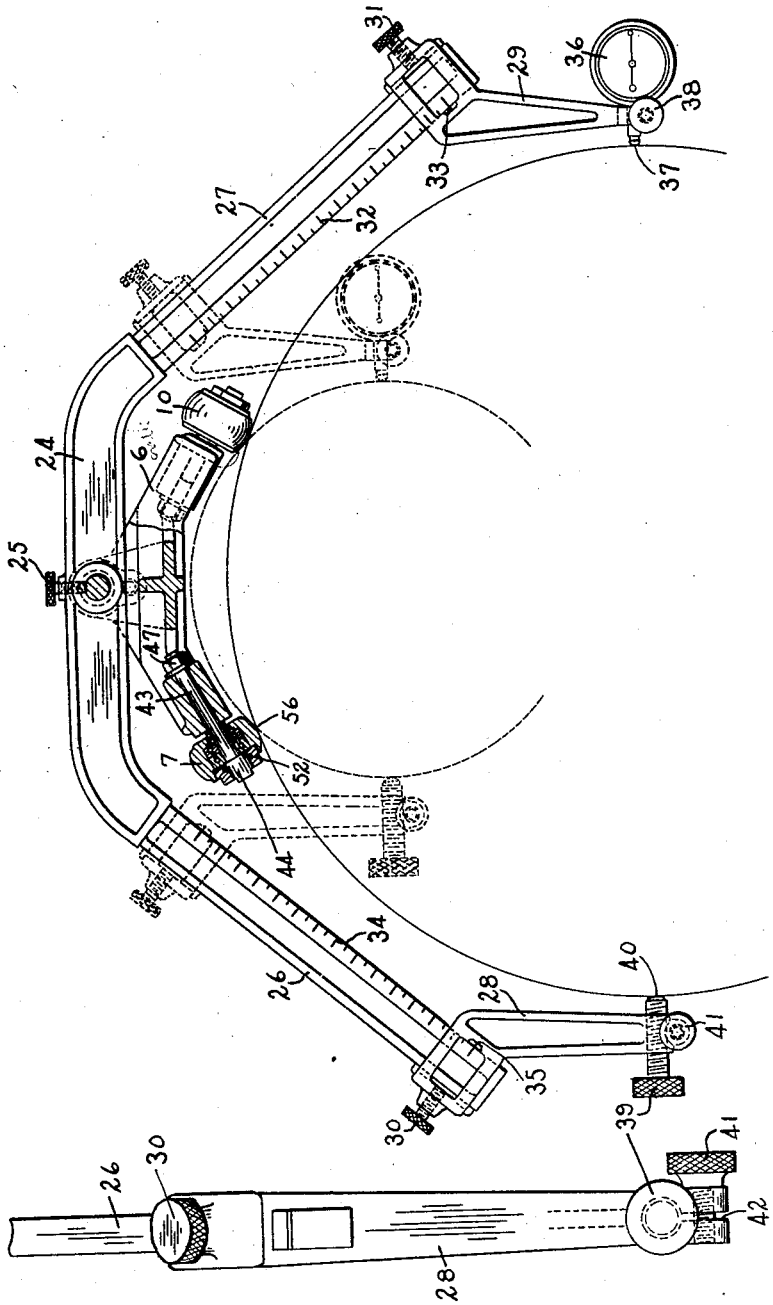

1,845,199

UNITED STATES PATENT OFFICE

CARL F. SCHNUCK, OF NEW HAVEN, CONNECTICUT, ASSIGNOR, BY MESNE ASSIGNMENTS, TO FARREL-BIRMINGHAM COMPANY, INCORPORATED, OF ANSONIA, CONNECTICUT, A CORPORATION OF CONNECTICUT

ROLL CALIPER

Application filed July 30, 1927. Serial No. 209,450.

This invention relates to a roll caliper, and more particularly to a micrometer roll caliper suitable for use in measuring the diameters of paper mill rolls, shafts, bearings, crank pins, etc.

The type of micrometer contemplated is, in general, like that shown in the patent to G. Vine, No. 601,721, of April 5, 1898, in which a cradle is provided adapted to rest upon the upper surface of a roll, or other object to be measured, and pivotally mounted on the cradle are a pair of integrally formed graduated arms, each having a downwardly extending slide supported thereon, one slide being provided with an indicator and the other a cooperating measuring point.

In calipers for measuring rolls, as hitherto known, and exemplified by the Vine patent above referred to, it has been necessary to adjust the position of the cradle whenever the measuring arms are adjusted, in order that the measuring points may be in contact with the roll at diametrically opposite points. As an object of my invention, I contemplate a micrometer caliper in which the necessity of adjusting the cradle is eliminated, the measuring points always being carried at diametrically opposite points, no matter what the particular size of the roll being measured, within the limits of the caliper.

In a more specific aspect, I contemplate a micrometer caliper in which the measuring points are adjusted towards and away from the cradle as they are adjusted towards and away from each other.

In measuring certain types of devices, for instance, the bottom roll of a paper calender which is usually made of greater diameter in the center than at the ends between which the roll tapers towards the center, it is customary to slide the caliper along the roll to gauge the diameter of the roll at various points, or to indicate the taper from one point to another. As another object of my invention, I contemplate a caliper which may be readily moved, with very little effort, along the roll in order to measure the diameter at any particular point.

Still another object of my invention is to provide a cradle for a caliper of the above type having means thereon for permitting the caliper to be readily moved along the roll, and in which that part of the cradle which is in contact with the surface of the roll has a roll engaging surface which will always be substantially tangent to the roll, no matter what the roll diameter within the limits of the caliper.

It is desirable that calipers of this type be suitable for use in measuring rolls up to substantially the extreme ends of the operative surfaces of the rolls, and as a further object of my invention, I contemplate a caliper in which the measuring arms may be carried at either end of the cradle in order to measure the diameter of the roll at the ends.

In a more specific aspect, provision is made for adjusting the measuring arms along the cradle and securing them at any desired point on the cradle.

To these and other ends, the invention consists in the novel features and combination of parts to be hereinafter described and claimed.

In the drawings,

Fig. 1 is an end view of a micrometer caliper according to my invention, showing the same mounted on a roll, with the measuring points engaging the roll at diametrically opposite points;

Fig. 2 is a plan view of the micrometer caliper shown in Fig. 1;

Fig. 3 is a sectional view, taken along line 3—3 of Fig. 2, on a slightly enlarged scale;

Fig. 4 is a view of one of the slides on an enlarged scale; and

Fig. 5 is a sectional view of one of the rollers for the cradle on an enlarged scale.

Referring to the drawings in which I have shown a preferred embodiment of my invention, the reference numeral 6 indicates a cradle substantially rectangular in form which is adapted to position the caliper on a roll or the like, and having at each of the four corners thereof rollers 7, 8, 9 and 10, adapted to rest on a roll, or other object to be measured, and support the cradle thereon. At the opposite ends of the cradle are upwardly extending arms 11 and 12, having mounted therein bearing sleeves 13 and 14, of which sleeve 14 is fixed, and sleeve 13 adjustable by means of screw 15, mounted in arm 11, and having a head 16, engaging the slot 17, in bearing 13, the screw 15, being secured in any particular position of adjustment by lock nut 18. Mounted between bearings 13 and 14 is a pivot shaft 19, having a tapered or conical end 20, received in sleeve 13, in the complemental opening 21, the opposite end of shaft 19 being provided with a conical or tapered end 22, received within the complemental tapered opening 23 of bearing 14.

The arrangement is such that the axis of the pivot shaft is parallel to the axis of the roll when the cradle is supported on a roll of uniform diameter.

Adjustably mounted on shaft 19 in a plane at right angles to the axis thereof is a swing bar 24, secured on shaft 19, by thumb screw 25, and having a pair of downwardly extending measuring arms 26 and 27, arranged substantially at right angles to one another and adapted to straddle a roll, or other object to be measured. On arm 26, is a slide 28, while on arm 27 is a slide 29, both of these slides being provided with thumb screws, such as 30 and 31, to lock them on their respective arms in any desired position of adjustment. The arm 27 is provided on one of its faces, adjacent the inner edge thereof, with graduations 32, while the slide 29 mounted thereon is provided with a reference line 33. The arm 26 is similarly graduated at 34, while the slide 28 is provided with a reference line 35. In the lower end of slide 29 is mounted an indicator 36, which preferably reads in 1/1000", the indicator being provided with a preferably hardened roll engaging point 37 and being secured in arm 29 by means of lock screw 38. In the lower end of slide 28 is an adjustable measuring point 39, having a preferably hardened roll engaging point 40, and adapted to be locked in any position of adjustment by means of lock screw 41. The end of the slide 28 is provided with a slit 42, in order to permit the lock screw 41 to clamp the adjustable measuring point 39, securely in place. The end of slide 29 may be slitted in a similar manner in order that lock screw 38 may clamp the indicator securely in place.

Each of the four rollers 7, 8, 9 and 10 is rotatably mounted on cradle 6 by means of a bolt 43, having a head 44, clamping a double cone 45 and a spacer 46 against the cradle 6, the bolt 43 being secured against displacement in the cradle by means of a nut 47, received on the inner end 48 of bolt 43, which is provided with threads at this point. Received on the cone 45 is a double row of hardened balls 49, having mounted thereon cups 50 and 51, received within the roll 7, and secured against displacement by means of a collar 52, secured in roll 7, by means of its threaded end 53. The roll 7 may be packed with lubricant, and packings 54 and 55 are provided to prevent the escape of the lubricant and the introduction of foreign matter. If desired, the outer end of bolt 43 may be provided with wrench faces 55ª, in order to hold the bolt against turning, while the nut 47 is adjusted to secure the bolt 43 in position in the cradle. The operative faces 56 of the rollers 7, 8, 9 and 10 are substantially spherical in form.

The angle between arms 26 and 27 is such that the measuring points 37 and 40 are always carried at diametrically opposite points of a roll when the caliper is supported on and adjusted to the roll. In Figure 1 of the drawings the caliper is shown in two positions, one in which it is adjusted to the largest roll that the caliper is capable of measuring, and the second (in dotted lines) in which it is engaging the smallest roll. In each instance, it will be seen that the measuring points engage the roll at diametrically opposite points.

In operation, the slides 28 and 29 may be adjusted to measure any particular diameter by means of standard measuring rods inserted between the measuring points on the arms 26 and 27. If desired, the indicator 36 may be brought to zero by adjusting the position of the point 40, and the caliper may then be placed upon a roll, to be measured, with the rollers of the cradle supported on the upper surface thereof and the measuring arms extending downwardly and straddling the roll. The indicator 36 will indicate the difference between the roll diameter and the standard measuring rod and, if desired, the caliper may be slid along the roll and the differences in diameter at the various points along the roll will be indicated. If it is desired to measure the roll adjacent the end thereof the overhanging measuring arms may be adjusted along the pivot shaft 19 and secured at either end of shaft 19, or any intermediate position, by means of the thumb screw 25. The shaft 19, being pivotally supported on the cradle 6, will permit the overhanging measuring arms to adjust themselves to the roll.

When it is desired to measure rolls of different diameters it is simply necessary to adjust the slides 28 and 29 along the arms 26 and 27, the adjustment of slides 28 and 29 simultaneously moving the measuring points relative to each other and to the cradle, so that the measuring points will always be in contact with a roll, or other object to be measured, at diametrically opposite points.

The rollers provided at each of the four corners of the cradle permit the cradle to be readily moved along on the upper surface of the roll, and the faces of the rollers 7, 8, 9 and 10 in contact with the roll being measured being substantially spherical in form, permit that portion of the cradle which is in contact with the roll to be substantially tangent to the roll at the point of contact, no matter what the diameter of the roll within the limits of the caliper.

While in this preferred form of my invention I have shown rollers on the cradle, it will be readily understood that cradles of other types may be used; for instance, one in which the roll engaging faces of the cradle are formed integrally therewith in the manner shown in the Vine patent above referred to.

While I have shown a preferred embodiment of my invention, it will be understood that the same is not to be limited to all the details shown but is capable of modification and variation within the spirit of the invention and the scope of the appended claims.

What I claim is:—

1. In a micrometer caliper for measuring a roll or the like, a cradle, a pair of integrally formed arms on said cradle, said arms extending downwardly at an angle to one another, and adjustable roll engaging means one on each of said arms, each of said means being adapted to be simultaneously adjusted relative to the other of said means and in the direction of said cradle.

2. In a micrometer caliper for measuring a roll or the like, a cradle, a pair of integrally formed arms pivotally mounted on said cradle, said arms extending downwardly at an angle to one another, and roll engaging means one on each of said arms, the angle between said arms being such that each of the roll engaging means thereon may be simultaneously adjusted relative to the other of said means and to said cradle.

3. In a micrometer caliper for measuring a roll or the like, a cradle, a pair of integrally formed arms pivotally mounted on said cradle, said arms extending downwardly at an angle to one another, adjustable slides on said arms, and measuring points on said slides, the angle between said arms being such that the adjustment of the slides thereon moves the measuring points towards and away from one another and towards and away from said cradle.

4. In a micrometer caliper for a roll or the like, a cradle of substantial length, a pair of measuring arms, and means for supporting said arms for movement on said cradle into position adjacent either end thereof.

5. In a micrometer caliper for a roll or the like, a cradle of substantial length, a pair of integrally formed arms, and pivotal means for supporting said arms on said cradle in a plurality of positions lengthwise of the cradle.

6. In a micrometer caliper for a roll or the like, a cradle of substantial length, a pair of integrally formed measuring arms, and pivotal means for supporting said arms on said cradle, said arms being adjustable along the pivotal means longitudinally of said cradle.

7. In a micrometer caliper for a roll or the like, a cradle of substantial length, a pair of integrally formed measuring arms, said arms extending downwardly at an angle to one another, pivotal means for supporting said arms on said cradle, said arms being adjustable along said pivotal means longitudinally of said cradle, and slides on said arms.

8. In a micrometer caliper for a roll or the like, a cradle of substantial length, a pivot shaft supported on said cradle, and measuring arms supported on said pivot shaft, said arms being adjustable on said shaft longitudinally of said cradle.

9. In a micrometer caliper for a roll or the like, a cradle, a pivot shaft supported on said cradle, a pair of integrally formed measuring arms adjustably supported on said shaft, said arms extending downwardly at an angle to one another, and slides on said arms.

10. In a micrometer caliper for a roll or the like, a cradle, a pivot shaft supported on said cradle, a pair of integrally formed arms supported on said shaft, said arms being adjustable along said shaft and extending downwardly at an angle to one another, and slides on said arms, the angle between said arms being such that said slides may be simultaneously adjusted towards one another and towards said cradle.

11. In a micrometer caliper for a roll or the like, a cradle of substantial length, a pivot shaft supported on said cradle, measuring arms adjustably secured on said pivot shaft, said pivot shaft being arranged to permit the measuring arms to be carried thereon adjacent either end of said cradle, and slides on said arms.

12. In a micrometer caliper for a roll or the like, a cradle of substantial length, a pivot shaft supported on said cradle, a pair of integrally formed measuring arms adjustably supported on said pivot shaft, said pivot shaft being arranged to permit the measuring arms to be carried thereon adjacent either end of the cradle, said measuring arms extending downwardly at an angle to one another, and slides on said arms, the angle between said arms being such that the slides may be simultaneously adjusted relative to one another and to said cradle.

13. In a micrometer caliper for a roll or the like, a cradle, rollers on said cradle, said rollers having rounded convex roll engaging surfaces and being adapted to support the cradle on a roll or other object being measured, measuring arms on said cradle, and slides on said measuring arms.

14. In a micrometer caliper for a roll or the like, a cradle of substantial length, cooperating roll engaging means, and pivotal means for supporting said roll engaging means on said cradle at either end thereof, said roll engaging means being adjustable relative to one another and to said cradle.

15. In a micrometer caliper for a roll or the like, a cradle of substantial length adapted to rest on the roll, a pivot shaft carried on said cradle, means for engaging the roll at diametrically opposite points, and supporting means for said roll engaging means carried on said pivot shaft and capable of adjustment thereon longitudinally of said cradle, said roll engaging means being adjustable relative to one another and to said cradle.

16. In a micrometer caliper for a roll or the like, a cradle, a plurality of shafts on said cradle, rollers on each of said shafts, said rollers having rounded convex roll engaging surfaces and being adapted to support the cradle on a roll or other object being measured, said shafts extending substantially tangentially to the surface of the roll on which the caliper is supported, measuring arms on said cradle and slides on said measuring rolls.

In witness whereof, I have hereunto set my hand this 21st day of July, 1927.

CARL F. SCHNUCK.